(12) United States Patent
Wei

(10) Patent No.: US 10,303,374 B2
(45) Date of Patent: May 28, 2019

(54) DATA CHECK METHOD AND STORAGE SYSTEM

(71) Applicant: HUAWEI TECHNOLOGIES CO.,LTD., Shenzhen, Guangdong (CN)

(72) Inventor: Mingchang Wei, Shenzhen (CN)

(73) Assignee: HUAWEI TECHNOLOGIES CO.,LTD., Shenzhen (CN)

( * ) Notice: Subject to any disclaimer, the term of this patent is extended or adjusted under 35 U.S.C. 154(b) by 0 days.

(21) Appl. No.: 16/110,504

(22) Filed: Aug. 23, 2018

(65) Prior Publication Data

US 2018/0364920 A1 Dec. 20, 2018

Related U.S. Application Data

(63) Continuation of application No. PCT/CN2016/107355, filed on Nov. 25, 2016.

(51) Int. Cl.
*G06F 3/06* (2006.01)
*G06F 12/00* (2006.01)
(Continued)

(52) U.S. Cl.
CPC .............. *G06F 3/0611* (2013.01); *G06F 3/06* (2013.01); *G06F 3/064* (2013.01); *G06F 3/0619* (2013.01); *G06F 3/0659* (2013.01); *G06F 3/0688* (2013.01); *G06F 3/0689* (2013.01); *G06F 11/14* (2013.01); *G06F 12/00* (2013.01); *G06F 12/0223* (2013.01); *G06F 12/0253* (2013.01);
(Continued)

(58) Field of Classification Search
CPC ...... G06F 3/0611; G06F 3/0619; G06F 3/064; G06F 3/0659; G06F 12/0223; G06F 12/0253; G06F 2212/1024; G06F 2212/1032; G06F 2212/154; G06F 2212/254

See application file for complete search history.

(56) References Cited

U.S. PATENT DOCUMENTS

| 5,958,078 A | 9/1999 | Yamamoto et al. |
| 2002/0161972 A1 | 10/2002 | Talagala et al. |

(Continued)

FOREIGN PATENT DOCUMENTS

| CN | 102546755 A | 7/2012 |
| CN | 102968498 A | 3/2013 |

(Continued)

*Primary Examiner* — Aracelis Ruiz
(74) *Attorney, Agent, or Firm* — Yeh Kurt Chang

(57) ABSTRACT

A storage system includes a host, a check node, and multiple data nodes. The host groups multiple data write requests into multiple data write request sets according to data node identifiers included in the data write requests. Each data write request set includes multiple data write requests having a same data node identifier. When a size of all data write requests in each of a specified quantity of data write request sets reaches a preset data amount, the host calculates check data of the specified quantity of data write request sets. Further, the host sends each data write request set to a data node indicated by an identifier, and sends the check data to the check node. Therefore, data of a same type can be stored in a same storage node and the data can be read from only one storage node, thereby improving data reading efficiency.

26 Claims, 7 Drawing Sheets

(51) Int. Cl.
*G06F 12/02* (2006.01)
*G06F 13/38* (2006.01)
*G06F 11/14* (2006.01)
*G06F 16/00* (2019.01)

(52) U.S. Cl.
CPC .............. *G06F 13/38* (2013.01); *G06F 16/00* (2019.01); *G06F 2212/1024* (2013.01); *G06F 2212/1032* (2013.01); *G06F 2212/154* (2013.01); *G06F 2212/254* (2013.01); *G06F 2213/3854* (2013.01)

(56) References Cited

U.S. PATENT DOCUMENTS

| | | | |
|---|---|---|---|
| 2006/0101215 A1* | 5/2006 | Yuasa | G06F 11/1004 711/162 |
| 2010/0077175 A1 | 3/2010 | Wu et al. | |
| 2015/0324371 A1 | 11/2015 | Guo et al. | |
| 2016/0285474 A1 | 9/2016 | Miyamae et al. | |

FOREIGN PATENT DOCUMENTS

| | | | |
|---|---|---|---|
| CN | 103699494 A | 4/2014 | |
| CN | 103761058 A | 4/2014 | |
| CN | 104216664 A | 12/2014 | |
| CN | 105404469 A | 3/2016 | |
| JP | H09231015 A | 9/1997 | |
| JP | 2014203233 A | 10/2014 | |
| JP | 2016510148 A | 4/2016 | |
| JP | 2016184372 A | 10/2016 | |

\* cited by examiner

DATA CHECK METHOD AND STORAGE SYSTEM

CROSS-REFERENCE TO RELATED APPLICATIONS

This application is a continuation of International Application No. PCT/CN2016/107355, filed on Nov. 25, 2016, the disclosure of which is hereby incorporated by reference in its entirety.

TECHNICAL FIELD

Embodiments of the present disclosure relate to the field of storage technologies, and in particular, to a data check method and a storage system.

BACKGROUND

In a distributed system including multiple storage nodes, a host sends multiple generated data write requests to multiple storage nodes. Each storage node stores some data write requests. A data write request includes data and a logical address of a storage node into which the data is to be written (hereinafter referred to as a logical address). To prevent a loss of a data write request stored in a storage node caused because a fault occurs on the storage node, the host calculates check data of the multiple generated data write requests, and sends the check data to one or more storage nodes for storage. To calculate the check data, the host groups, according to a predetermined size, multiple data write requests that reach a specified size, to obtain multiple data units, and then calculates check units of the multiple data units. These data units and check units form a stripe. Finally, the host sends each data unit or each check unit to a storage node for storage. These data write requests are randomly grouped into multiple data units, and sent to different storage nodes for storage. Therefore, during data reading, data carried in the multiple data write requests usually needs to be collected from different storage nodes. A cross-storage node read operation affects data reading efficiency.

SUMMARY

A first aspect of the present disclosure provides a storage system. The storage system includes a host, a check node, and multiple data nodes. Each data node has a unique identifier. The host is configured to group multiple data write requests into multiple data write request sets according to data node identifiers included in the data write requests. Each data write request set includes one or more data write requests having a same data node identifier. Each data write request includes data, a logical address into which the data is to be written, and an identifier of a data node into which the data is to be written. The data node into which the data is to be written is selected by the host according to the data or the logical address. Alternatively, when triggering multiple data write requests on a host 11, a user sends an instruction to the host 11 to require these data write requests to be written into a same data node. The host 11 may select a data node for these data write requests according to the user requirement, and add an identifier of the data node to each data write request. When a size of all data write requests in each of a specified quantity of data write request sets reaches a preset data amount, the host calculates check data of the specified quantity of data write request sets. The specified quantity of data write request sets are subsets of the multiple data write request sets. The host sends each of the specified quantity of data write request sets to a data node indicated by a data node identifier included in the data write request set, and sends the check data to the check node.

According to the storage system provided in the present disclosure, a host groups multiple data write requests into multiple data write request sets according to data node identifiers included in the data write requests. When sizes of all data write requests in a specified quantity of data write request sets reach a preset data amount, the host calculates check data of the specified quantity of data write request sets, and sends the check data to a check node for storage. Therefore, data reliability is ensured. Each data write request set includes multiple data write requests to be written into a same data node, and a data node into which each data write request is to be written is selected by the host according to data in the data write request or a logical address, in the data write request, into which the data is to be written. Therefore, each data write request set includes data write requests of a same type. After calculating the check data, the host sends each data write request set to a data node indicated by an identifier included in the data write request set. In this way, the data write requests of the same type are stored in a same data node. There is a relatively high possibility of simultaneously reading data in the data write requests of the same type. Therefore, the data can be read from one data node, and a cross-node read operation does not need to be performed, thereby improving data reading efficiency.

With reference to the first aspect, in a first implementation of the first aspect, the host is further configured to: allocate an identifier to each data write request in the specified quantity of data write request sets, and send the identifier of each data write request set to the data node indicated by the data node identifier included in the data write request set. The data node is configured to receive a data write request set and an identifier of the data write request set. The data node is further configured to create and store metadata. The metadata includes a correspondence between the identifier of the data write request set and a logical address into which data in each data write request is to be written and a correspondence between the logical address into which the data in each data write request is to be written and an internal offset. In the present disclosure, data write requests of a same type are stored as one data write request set in one data node. Therefore, metadata related to the data write request set is also locally stored in the data node. If an operation such as garbage collection is performed on the data write request set subsequently, the metadata can be directly modified locally.

With reference to the first implementation of the first aspect, in a second implementation of the first aspect, the storage system further includes a metadata check calculation node and a metadata check node. The data node is further configured to: when determining that accumulated metadata reaches the preset data amount, send a metadata set and an identifier of the data node to the metadata check calculation node. The metadata set includes the accumulated metadata that reaches the preset data amount. The metadata check calculation node is configured to: receive a metadata set and an identifier of each of the multiple data nodes, where the metadata set and the identifier are sent by the data node, store a correspondence between each metadata set and a data node identifier, and select a specified quantity of metadata sets from multiple received metadata sets according to the correspondence. The specified quantity of selected metadata sets are corresponding to different data node identifiers. The metadata check calculation node is further configured to calculate check data of the specified quantity of selected metadata sets. Then, the metadata check calculation node sends the check data of the specified quantity of metadata sets to the metadata check node. The metadata check node is different from a data node storing each of the specified quantity of metadata sets. Therefore, according to the storage system provided in the present disclosure, reliability of a metadata set stored in each data node is ensured.

With reference to the first implementation of the first aspect, in a third implementation of the first aspect, the storage system further includes a garbage collection node. The garbage collection node is configured to perform a systematic garbage collection operation. Specifically, the garbage collection node selects, from multiple stripes according to a correspondence between an identifier of a stripe and an identifier of each data write request set included in the stripe and according to a bitmap of a data write request set, a stripe including a largest amount of invalid data, where the correspondence is sent by the host, and the bitmap is sent by the data node. In the present disclosure, the stripe includes the specified quantity of data write request sets and the check data calculated according to these data write request sets. In the present disclosure, the bitmap is used to indicate a data amount of invalid data included in the data write request set. The garbage collection node uses the stripe including the largest amount of invalid data as a to-be-reclaimed stripe, and sends a garbage collection notification message to a data node in which each data write request set included in the to-be-reclaimed stripe is located. Each garbage collection notification message is used to instruct the data node to perform systematic garbage collection. Each garbage collection notification message includes an identifier of a data write request set. The garbage collection node selects a stripe including invalid data to perform a systematic garbage collection operation. Therefore, efficiency of systematic garbage collection is improved.

With reference to the third implementation of the first aspect, in a fourth implementation of the first aspect, after receiving the garbage collection notification message, the data node performs a systematic garbage collection operation on the data write request set according to the identifier of the data write request set and a stored bitmap of the data write request set. Specifically, the data node determines a to-be-reclaimed data write request set according to the identifier of the data write request set. Next, the data node determines, according to the bitmap of the data write request set, a logical address into which valid data included in the data write request set is to be written, removes a correspondence between the logical address into which the valid data is to be written and the identifier of the data write request set, and stores a correspondence between the logical address into which the valid data is to be written and an identifier of a recombined data write request set. Then, the data node sends a hard disk logical address of the data write request set to a solid state disk, and the solid state disk records blocks corresponding to the hard disk logical address as invalid. When performing internal garbage collection subsequently, the solid state disk can directly erase these blocks, and does not need to replicate the valid data. Therefore, a quantity of times of write amplification internally performed on the solid state disk is reduced. In addition, systematic garbage collection provided in the present disclosure means that each data node combines valid data into another local data write request set. Therefore, the data node independently completes systematic garbage collection and does not need to exchange data with another data node, thereby saving bandwidth between data nodes.

A second aspect of the present disclosure provides a data check method, applied to the storage system of the first aspect or any implementation of the first aspect.

A third aspect of the present disclosure provides a host, and a function of the host is consistent with that of the storage system provided in the first implementation of the first aspect.

A fourth aspect of the present disclosure provides a storage system. The storage system includes a check node, a check calculation node, and multiple data nodes. Each data node is configured to send a data write request set to the check calculation node. The data write request set includes one or more data write requests, and each data write request includes data and an identifier of a data node into which the data is to be written. A size of the data write request set is equal to a preset data amount. The check calculation node is configured to: receive multiple data write request sets, and select a specified quantity of data write request sets from the multiple data write request sets. The specified quantity of data write request sets are subsets of the multiple data write request sets, and the specified quantity of data write request sets include different data node identifiers. Then, the check calculation node calculates check data of the specified quantity of data write request sets, and sends the check data to the check node. The check node is different from a data node in which each of the specified quantity of data write request sets is located.

According to the storage system provided in the present disclosure, when a size of all accumulated data write requests reaches a preset data amount, each data node sends these data write requests as one data write request set to a check calculation node. The check calculation node selects a specified quantity of data write request sets from multiple received data write request sets, calculates check data of the specified quantity of data write request sets, and sends the check data to a check node for storage. Therefore, data reliability is ensured.

With reference to the fourth aspect, in a first implementation of the fourth aspect, each data write request further includes a logical address into which the data is to be written, and the data node into which the data is to be written is selected by a host in the storage system according to the data or the logical address into which the data is to be written, or the data node into which the data is to be written may not be selected by the host, but is directly specified by a user when a data write request is triggered on the host. Each data node is further configured to receive multiple data write requests sent by the host. Each data write request set includes multiple data write requests having a same data node identifier, and a data node into which each data write request is to be written is selected by the host according to data in the data write request or a logical address, in the data write request, into which the data is to be written. Therefore, each data write request set includes data write requests of a same type. There is a relatively high possibility of simultaneously reading data in the data write requests of the same type. Therefore, the data can be read from one data node, and a cross-node read operation does not need to be performed, thereby improving data reading efficiency.

With reference to the first implementation of the fourth aspect, in a second implementation of the fourth aspect, the data node is further configured to: allocate an identifier to a stored data write request set, and send the identifier of the data write request set to the check calculation node. Then, the data node creates and stores metadata. The metadata includes a correspondence between the identifier of the data write request set and a logical address into which data in each data write request is to be written and a correspondence between the logical address into which the data in each data write request is to be written and an internal offset. In the present disclosure, data write requests of a same type are stored as one data write request set in one data node. Therefore, metadata related to the data write request set is also locally stored in the data node. If an operation such as garbage collection is performed on the data write request set subsequently, the metadata can be directly modified locally.

With reference to the second implementation of the fourth aspect, in a third implementation of the fourth aspect, the storage system further includes a metadata check calculation node and a metadata check node. The data node is further configured to: when determining that accumulated metadata reaches the preset data amount, send a metadata set and an identifier of the data node to the metadata check calculation node. The metadata set includes the accumulated metadata that reaches the preset data amount. The metadata check calculation node is configured to: receive a metadata set and an identifier of each data node that are sent by the data node, and store a correspondence between each metadata set and a data node identifier. In addition, the metadata check calculation node selects specified quantity of metadata sets from multiple received metadata sets according to the correspondence. The specified quantity of metadata sets are corresponding to different data node identifiers. The metadata check calculation node calculates check data of the specified quantity of metadata sets, and sends the check data of the specified quantity of metadata sets to the metadata check node. The metadata check node is different from a data node storing each of the specified quantity of metadata sets. Therefore, according to the storage system provided in the present disclosure, reliability of a metadata set stored in each data node is ensured.

With reference to the second implementation of the fourth aspect, in a fourth implementation of the fourth aspect, the storage system further includes a garbage collection node. The check calculation node is further configured to allocate an identifier to a stripe. The stripe includes the specified quantity of data write request sets and the check data of the specified quantity of data write request sets. Then, the check calculation node sends a correspondence between the stripe identifier and an identifier of each data write request set included in the stripe to the garbage collection node. Each data node is further configured to send a stored bitmap of a data write request set to the garbage collection node. The bitmap is used to indicate a data amount of invalid data in the data write request set. The garbage collection node is configured to: select, from multiple stripes according to the correspondence between the stripe identifier and the identifier of each data write request set included in the stripe and according to a bitmap of each data write request set, a stripe including a largest amount of invalid data, and send a garbage collection notification message to a data node in which each data write request set included in the stripe is located. Each garbage collection notification message includes an identifier of a data write request set. The garbage collection node selects a stripe including invalid data to perform a systematic garbage collection operation. Therefore, efficiency of systematic garbage collection is improved.

With reference to the fourth implementation of the fourth aspect, in a fifth implementation of the fourth aspect, after receiving the garbage collection notification message, the data node performs a systematic garbage collection operation on the data write request set according to the identifier of the data write request set and a stored bitmap of the data write request set. Specifically, the data node determines a to-be-reclaimed data write request set according to the identifier of the data write request set. Next, the data node determines, according to the bitmap of the data write request set, a logical address into which valid data included in the data write request set is to be written, removes a correspondence between the logical address into which the valid data is to be written and the identifier of the data write request set, and stores a correspondence between the logical address into which the valid data is to be written and an identifier of a recombined data write request set. Then, the data node sends a hard disk logical address of the data write request set to a solid state disk, and the solid state disk records blocks corresponding to the hard disk logical address as invalid. When performing internal garbage collection subsequently, the solid state disk can directly erase these blocks, and does not need to replicate the valid data. Therefore, a quantity of times of write amplification internally performed on the solid state disk is reduced. In addition, systematic garbage collection provided in the present disclosure means that each data node combines valid data into another local data write request set. Therefore, the data node independently completes systematic garbage collection and does not need to exchange data with another data node, thereby saving bandwidth between data nodes.

A fifth aspect of the present disclosure provides a data check method, applied to the storage system of the fourth aspect or any implementation of the fourth aspect.

A sixth aspect of the present disclosure provides a storage system. The storage system includes a host, a check calculation node, and multiple data nodes. Each data node has a unique identifier. The host sends multiple generated data write requests to the check calculation node. Each data write request set includes one or more data write requests having a same data node identifier. Each data write request includes data, a logical address into which the data is to be written, and an identifier of a data node into which the data is to be written. The data node into which the data is to be written is selected by the host according to the data or the logical address; or the data node into which the data is to be written may not be selected by the host, but is directly specified by a user when a data write request is triggered on the host. The check calculation node is configured to group multiple data write requests into multiple data write request sets according to data node identifiers included in the data write requests. When a size of all data write requests in each of a specified quantity of data write request sets reaches a preset data amount, the check calculation node calculates check data of the specified quantity of data write request sets. The specified quantity of data write request sets are subsets of the multiple data write request sets. The check calculation node sends each of the specified quantity of data write request sets to a data node indicated by a data node identifier included in the data write request set. The check calculation node stores the check data.

According to the storage system provided in the present disclosure, a check calculation node groups multiple data write requests into multiple data write request sets according to data node identifiers included in the data write requests. When sizes of all data write requests in a specified quantity of data write request sets reach a preset data amount, the check calculation node calculates check data of the specified quantity of data write request sets, and sends the check data to a check node for storage. Therefore, data reliability is ensured. Each data write request set includes multiple data write requests to be written into a same data node, and a data node into which each data write request is to be written is selected by the host according to data in the data write request or a logical address, in the data write request, into which the data is to be written. Therefore, each data write request set includes data write requests of a same type. After calculating the check data, the check calculation node sends each data write request set to a data node indicated by an identifier included in the data write request set. In this way, the data write requests of the same type are stored in a same data node. There is a relatively high possibility of simultaneously reading data in the data write requests of the same type. Therefore, the data can be read from one data node, and a cross-node read operation does not need to be performed, thereby improving data reading efficiency.

With reference to the sixth aspect, in a first implementation of the sixth aspect, the check calculation node is further configured to: allocate an identifier to each data write request in the specified quantity of data write request sets, and send the identifier of each data write request set to the data node indicated by the data node identifier included in the data write request set. The data node is configured to receive a data write request set and an identifier of the data write request set. The data node is further configured to create and store metadata. The metadata includes a correspondence between the identifier of the data write request set and a logical address into which data in each data write request is to be written and a correspondence between the logical address into which the data in each data write request is to be written and an internal offset. In the present disclosure, data write requests of a same type are stored as one data write request set in one data node. Therefore, metadata related to the data write request set is also locally stored in the data node. If an operation such as garbage collection is performed on the data write request set subsequently, the metadata can be directly modified locally.

With reference to the first implementation of the sixth aspect, in a second implementation of the sixth aspect, the storage system further includes a metadata check calculation node and a metadata check node. The data node is further configured to: when determining that accumulated metadata reaches the preset data amount, send a metadata set and an identifier of the data node to the metadata check calculation node. The metadata set includes the accumulated metadata that reaches the preset data amount. The metadata check calculation node is configured to: receive a metadata set and an identifier of each of the multiple data nodes, where the metadata set and the identifier are sent by the data node, store a correspondence between each metadata set and a data node identifier, and select a specified quantity of metadata sets from multiple received metadata sets according to the correspondence. The specified quantity of selected metadata sets are corresponding to different data node identifiers. The metadata check calculation node is further configured to calculate check data of the specified quantity of selected metadata sets. Then, the metadata check calculation node sends the check data of the specified quantity of metadata sets to the metadata check node. The metadata check node is different from a data node storing each of the specified quantity of metadata sets. Therefore, according to the storage system provided in the present disclosure, reliability of a metadata set stored in each data node is ensured.

With reference to the first implementation of the sixth aspect, in a third implementation of the sixth aspect, the storage system further includes a garbage collection node. The garbage collection node is configured to perform a systematic garbage collection operation. Specifically, the garbage collection node selects, from multiple stripes according to a correspondence between an identifier of a stripe and an identifier of each data write request set included in the stripe and according to a bitmap of a data write request set, a stripe including a largest amount of invalid data, where the correspondence is sent by the check calculation node, and the bitmap is sent by the data node. In the present disclosure, the stripe includes the specified quantity of data write request sets and the check data calculated according to these data write request sets. In the present disclosure, the bitmap is used to indicate a data amount of invalid data included in the data write request set. The garbage collection node uses the stripe including the largest amount of invalid data as a to-be-reclaimed stripe, and sends a garbage collection notification message to a data node in which each data write request set included in the to-be-reclaimed stripe is located. Each garbage collection notification message is used to instruct the data node to perform systematic garbage collection. Each garbage collection notification message includes an identifier of a data write request set. The garbage collection node selects a stripe including invalid data to perform a systematic garbage collection operation. Therefore, efficiency of systematic garbage collection is improved.

With reference to the third implementation of the sixth aspect, in a fourth implementation of the sixth aspect, after receiving the garbage collection notification message, the data node performs a systematic garbage collection operation on the data write request set according to the identifier of the data write request set and a stored bitmap of the data write request set. Specifically, the data node determines a to-be-reclaimed data write request set according to the identifier of the data write request set. Next, the data node determines, according to the bitmap of the data write request set, a logical address into which valid data included in the data write request set is to be written, removes a correspondence between the logical address into which the valid data is to be written and the identifier of the data write request set, and stores a correspondence between the logical address into which the valid data is to be written and an identifier of a recombined data write request set. Then, the data node sends a hard disk logical address of the data write request set to a solid state disk, and the solid state disk records blocks corresponding to the hard disk logical address as invalid. When performing internal garbage collection subsequently, the solid state disk can directly erase these blocks, and does not need to replicate the valid data. Therefore, a quantity of times of write amplification internally performed on the solid state disk is reduced. In addition, systematic garbage collection provided in the present disclosure means that each data node combines valid data into another local data write request set. Therefore, the data node independently completes systematic garbage collection and does not need to exchange data with another data node, thereby saving bandwidth between data nodes.

A seventh aspect of the present disclosure provides a data check method, applied to a storage system of the sixth aspect or any implementation of the sixth aspect.

BRIEF DESCRIPTION OF DRAWINGS

To describe the technical solutions in the embodiments of the present disclosure more clearly, the following briefly describes the accompanying drawings required for the embodiments.

DESCRIPTION OF EMBODIMENTS

The embodiments of the present disclosure provide a data check method and a storage system, so that, in addition to ensuring data reliability, data of a same type can be stored in a same storage node and the data can be read from only one storage node, thereby improving data reading efficiency.

Figure 1:
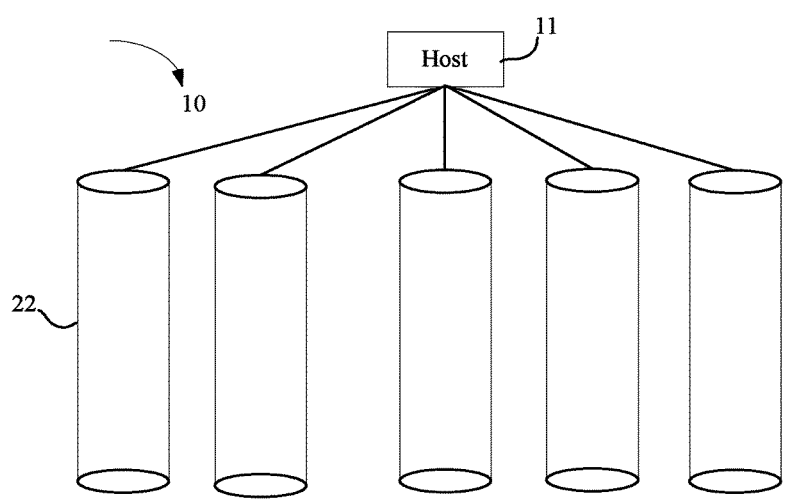
FIG. 1 is a composition diagram of a storage system according to an embodiment of the present disclosure.

FIG. 1 shows a composition diagram of a storage system 10 according to an embodiment of the present disclosure. The storage system 10 shown in FIG. 1 includes a host 11 and multiple storage nodes 22. FIG. 1 is merely used as an example for description, but does not limit a specific networking mode, such as cascaded tree networking or ring networking, provided that the host 11 can communicate with the storage nodes 22.

The host 11 may include any computing device such as a server or a desktop computer. A user may trigger a read or write instruction by using the host 11, and send a data write request or a data read request to the storage nodes 22. In this embodiment, the host 11 may communicate with any storage node 22, and any two storage nodes 22 may also communicate with each other.

Figure 2:
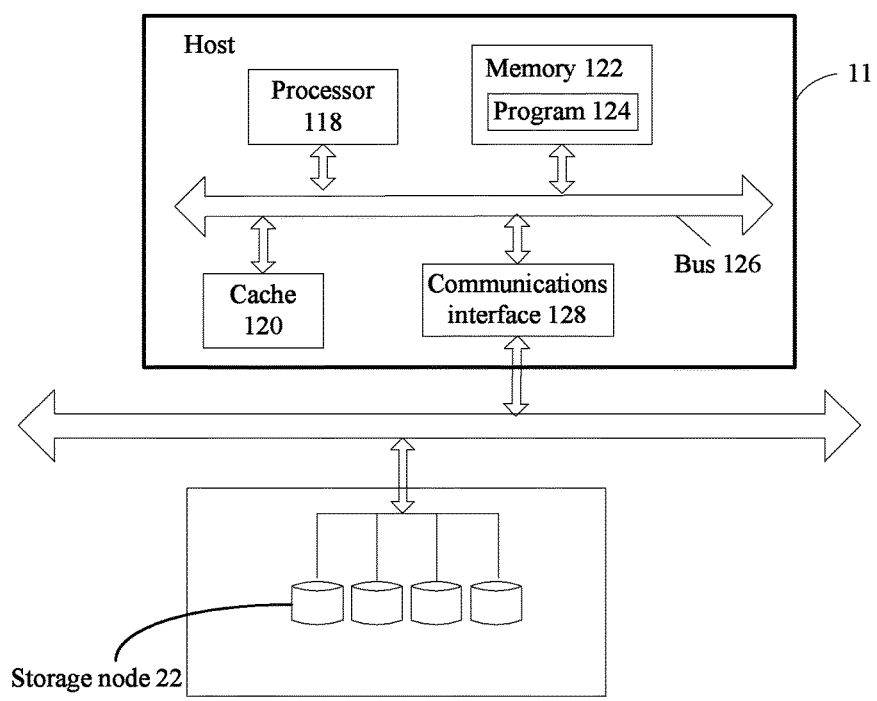
FIG. 2 is a structural diagram of a host according to an embodiment of the present disclosure.

As shown in FIG. 2, a host 11 mainly includes a processor 118, a cache 120, a memory 122, a communications bus (bus for short) 126, and a communication interface 128. The processor 118, the cache 120, the memory 122, and the communications interface 128 implement mutual communication by using the communications bus 126.

The communications interface 128 is configured to communicate with a storage node 22.

The memory 122 is configured to store a program 124. The memory 122 may include a high-speed RAM memory, and may further include a non-volatile memory, for example, at least one magnetic disk memory. It may be understood that the memory 122 may be any machine-readable medium that can store program code, such as a random access memory (RAM), a magnetic disk, a hard disk, a solid state disk (SSD), or a non-volatile memory.

The program 124 may include program code.

The cache 120 is configured to cache data received from an application server 10 or data read from the storage node 22. The cache 120 may be any machine-readable medium that can store data, such as a RAM, a ROM, a flash memory, or a solid state disk (SSD). This is not limited herein.

In addition, the memory 122 and the cache 120 may be integrated together or disposed separately, and this is not limited in this embodiment of the present disclosure.

The processor 118 may be a central processing unit (CPU), and is configured to generate and process a data write request, and the like.

The storage node 22 may be a disk array, a flash memory array, or a storage server. The disk array is a storage device including at least one controller and multiple disks. The flash memory array is a storage device including at least one controller and multiple solid state disks (SSD). A solid state disk is a memory that uses a flash memory chip as a storage medium, and is also referred to as a solid state drive (SSD). In addition, the storage node 22 may further be a storage server, and the storage server includes at least one solid state disk.

Figure 3:
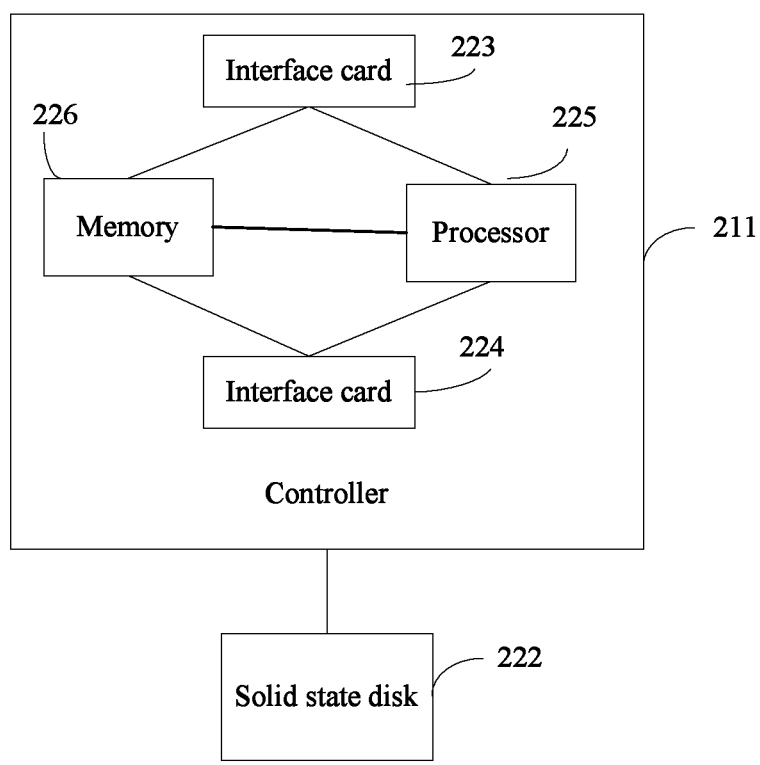
FIG. 3 is a structural diagram of a flash memory array according to an embodiment of the present disclosure.

The flash memory array is used as an example. As shown in FIG. 3, the storage node 22 includes a controller 221 and one or more solid state disks 222. The controller 221 includes at least an interface 223, an interface 224, a processor 225, and a memory 226.

The interface 223 is configured to communicate with the host 11. The interface 224 is configured to communicate with the solid state disk 222. The processor 225 may be a central processing unit (CPU).

The processor 225 is configured to: receive a data write request or a data read request from the host 11, and process the data write request or the data read request. The processor 225 may further send data in the data write request to the solid state disk 222.

The memory 226 is configured to store a program. In addition, the memory 226 is further configured to temporarily store the data write request received from the host 11 or data read from the solid state disk 222. After receiving multiple data write requests sent by the host, the controller 221 may temporarily store the multiple data write requests to the memory 226. When a size of the multiple data write requests reaches a preset data amount, the multiple data write requests stored in the memory 226 are sent to a check calculation node. The memory 226 includes a random access memory (English: random-access memory, RAM). Optionally, the memory 226 further includes a non-volatile memory (English: non-volatile memory), for example, at least one magnetic memory. It may be understood that the memory 226 may be any machine-readable medium that can store program code, such as a random access memory (Random-Access Memory, RAM), a magnetic disk, a hard disk, a solid state disk (Solid State Disk, SSD), or a non-volatile memory.

In multiple storage nodes in this embodiment, a storage node configured to store a data write request sent by the host 11 is referred to as a data node; a storage node configured to calculate check data of multiple data write requests is referred to as a check calculation node; a storage node configured to store the check data of the multiple data write requests is referred to as a check node; a storage node configured to calculate check data of metadata is referred to as a metadata check calculation node; and a node configured to perform systematic garbage collection is referred to as a garbage collection node. However, such division is not absolute. For example, the check node storing the check data may also be used as the data node to store the data write request.

The present disclosure provides at least two application scenarios. In an application scenario, the host 11 has a function of calculating check data of multiple data write requests. For example, the host 11 groups the multiple data write requests into multiple data write request sets according to identifiers, included in the data write requests, of data nodes into which data is to be written. Each set includes data write requests to be written into a same data node. When sizes of all data write requests in some or all sets reach a preset data amount, the host 11 calculates check data of these data write request sets.

In another application scenario, the host 11 does not have a function of calculating check data of multiple data write requests, and an operation of calculating the check data is implemented by a check calculation node in storage nodes. The host 11 sends each data write request to a data node according to an identifier of the data node into which data carried in the data write request is to be written. Each data node receives the multiple data write requests sent by the host 11. When a size of a data write request set (the data write request set includes multiple data write requests) reaches a preset data amount, the data node sends the data write request set to the check calculation node, and the check calculation node calculates check data of multiple data write request sets.

The following separately discusses a data check method based on the foregoing two application scenarios.

Figure 4:
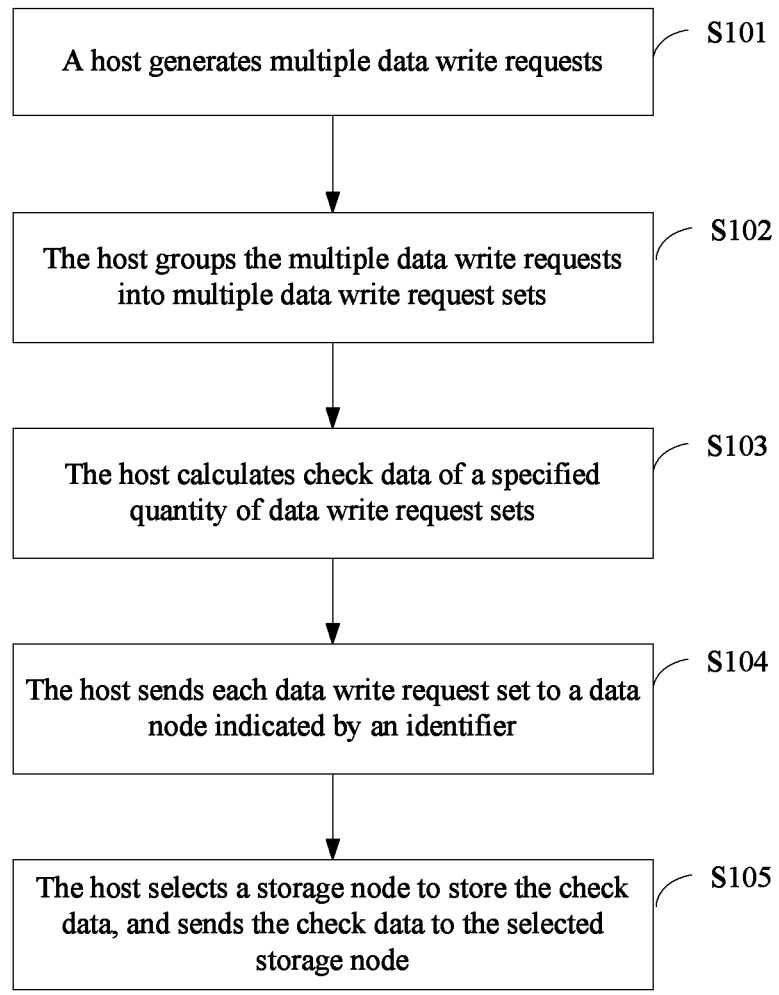
FIG. 4 is a schematic flowchart of a data check method according to an embodiment of the present disclosure.

FIG. 4 is a flowchart of a data check method applied to a first scenario. As shown in FIG. 4, the method includes the following steps. For example, step S101 to step S104 may be performed by a processor 118 in a host 11.

S101, The host 11 generates multiple data write requests, where each data write request includes data, an identifier of a data node into which the data is to be written, and a logical address into which the data is to be written. The logical address into which the data is to be written includes an identifier of a logical unit, a logical block address (LBA), and a length. The identifier of the logical unit is used to indicate the logical unit into which the data is to be written. The logical block address is used to indicate a location at which the data is located in the logical unit. The length indicates a size of the data. The identifier of the data node into which the data is to be written is used to indicate the data node into which the data is to be written. The data node into which the data is to be written is selected by the host 11 from multiple data nodes in a storage system 10 according to the data or the logical address into which the data is to be written.

Specifically, first, the host 11 pre-collects information about the data nodes in the storage system 10. The information about the data nodes includes a quantity of data nodes included in the storage system 10 and an identifier of each data node. An identifier of a data node is used to uniquely identify the data node. For example, the storage system 10 includes five data nodes, and identifiers of the data nodes are respectively A, B, C, D, and E. The host 11 may send a query request to each data node to obtain an identifier of the data node, or each data node may proactively report an identifier of the data node to the host 11. Alternatively, a primary node may be specified in the storage system 10, and the primary node collects identifiers of the data nodes and reports the identifiers of the data nodes to the host 11.

Then, the host 11 determines the data node into which the data is to be written. In an implementation, the host 11 determines, according to the logical address into which the data is to be written, the data node into which the data is to be written. For example, the host 11 uses the logical address, included in each data write request, into which the data is to be written as an input entry, and obtains a hash value by using a preset hash algorithm. The hash value is uniquely corresponding to an identifier of a data node. In addition, the host 11 may further determine the identifier of the data node by using a hash algorithm or a remainder operation. An algorithm for determining the identifier of the data node is not limited in this embodiment, provided that an identifier of a data node can be uniquely determined according to the logical address. In another implementation, the host 11 determines, according to the data, the data node into which the data is to be written. For example, the host 11 uses the data as an input entry, and obtains a hash value by using a preset hash algorithm. The hash value is uniquely corresponding to an identifier of a data node. Likewise, the host 11 may further determine the identifier of the data node by using a hash algorithm or a remainder operation. In still another implementation, the host 11 classifies the multiple data write requests according to users triggering the data write requests, and selects a same data node for data write requests triggered by a same user. Alternatively, the host 11 may classify these data write requests according to a data type, and select a same data node for data of a same type.

After selecting the data node for the data, the host 11 writes the identifier of the data node into a data write request carrying the data. The identifier of the data node may be located at a header of the data write request, or may be a payload (English: payload) of the data write request.

When triggering the multiple data write requests on the host 11, a user sends an instruction to the host 11 to require these data write requests to be written into a same data node. The host 11 may select a data node for these data write requests according to the user requirement, and add an identifier of the data node to each data write request.

An identifier of a data node in each data write request is allocated by the host 11 according to data or a logical address into which the data is to be written, where the data or the logical address is included in the data write request. Therefore, data write requests having a same identifier are data write requests of a same type. There is a relatively high possibility of simultaneously reading data carried in these data write requests.

S102, The host groups the multiple data write requests into multiple data write request sets according to data node identifiers included in the data write requests, where each set includes multiple data write requests having a same data node identifier.

It should be noted that, in an actual implementation, the multiple data write requests do not need to be stored at different locations. The "grouping" herein is merely logical, and the multiple data write requests are classified according to different data node identifiers. For example, multiple data write requests in a data write request set include an identifier of a data node A, multiple data write requests in another data write request set include an identifier of a data node B, and multiple data write requests in still another data write request set include an identifier of a data node C.

S103, When a size of all data write requests in each of a specified quantity of data write request sets reaches a preset data amount, the host 11 calculates check data of the specified quantity of data write request sets.

Generally, the storage system 10 includes several data nodes. Correspondingly, the host 11 also has several data write request sets. As generated data write requests increase, a size of each data write request set is being accumulated. The host 11 needs to select the specified quantity of data write request sets from data write request sets whose sizes reach the preset data amount, and calculate the check data of the specified quantity of data write request sets. The preset data amount is preset, for example, 16 KB. The specified quantity is determined according to a check mode preset by the storage system 10.

The preset check mode includes a 5+1 mode, a 6+2 mode, or the like. In the 5+1 mode, one piece of check data is generated according to five data write request sets. In the 6+2 mode, two pieces of check data are generated according to six data write request sets. The 5+1 mode is used as an example. The host 11 selects five data write request sets from multiple data write request sets whose sizes reach the preset data amount, and then calculates check data of the five data write request sets. The five data write request sets and the check data form a stripe (English: stripe). The data write request set whose size reaches the preset data amount is a data unit of the stripe.

S104, The host 11 sends each of the specified quantity of data write request sets to a data node indicated by an identifier included in the data write request set.

It can be learned from the foregoing discusses that all data write requests in each data write request set include a same data node identifier, and therefore, the host may send, according to the identifier, each data write request set to a data node indicated by the identifier.

S105, The host 11 selects a storage node from a storage system 10, to store the check data, and sends the check data to the selected storage node, where the storage node configured to store the check data is different from a data node in which each data write request set included in a stripe is located. For ease of description, the storage node storing the check data is referred to as a check node.

The host 11 may select one or more storage nodes from remaining storage nodes (except the data node configured to store the data write request set) to store the check data. Generally, a data write request set and check data in a stripe cannot be stored in a same storage node. This is intended for preventing that both the data write request set and the check data are lost when a fault occurs on the storage node. However, in an actual application, multiple stripes may be usually constructed in the host 11. A selected storage node configured to store check data in a stripe cannot be a storage node storing a data write request set in the stripe, but may be a storage node storing a data write request set in another stripe. In this embodiment, a storage node is not limited to be dedicated to store a data write request set or check data.

In addition, the host 11 allocates a stripe identifier to each stripe. Different stripes have different stripe identifiers. Moreover, the host allocates identifiers to data write request sets and check data that are included in each stripe, and sends an identifier of a data write request set to a data node in which the data write request set is located. The host 11 records a correspondence between a stripe identifier of each stripe and an identifier of each data write request set included in the stripe and a correspondence between the stripe identifier and an identifier of check data.

According to the data check method shown in FIG. 4, a host 11 groups multiple data write requests into multiple data write request sets according to data node identifiers included in the data write requests. When sizes of all data write requests in a specified quantity of data write request sets reach a preset data amount, the host 11 calculates check data of the specified quantity of data write request sets, and sends the check data to a check node for storage. Therefore, data reliability is ensured. Each data write request set includes multiple data write requests to be written into a same data node, and a data node into which each data write request is to be written is selected by the host according to data in the data write request or a logical address, in the data write request, into which the data is to be written. Therefore, each data write request set includes data write requests of a same type. After calculating the check data, the host 11 sends each data write request set to a data node indicated by an identifier included in the data write request set. In this way, the data write requests of the same type are stored in a same data node. There is a relatively high possibility of simultaneously reading data in the data write requests of the same type. Therefore, the data can be read from one data node, and a cross-node read operation does not need to be performed, thereby improving data reading efficiency.

Figure 5:
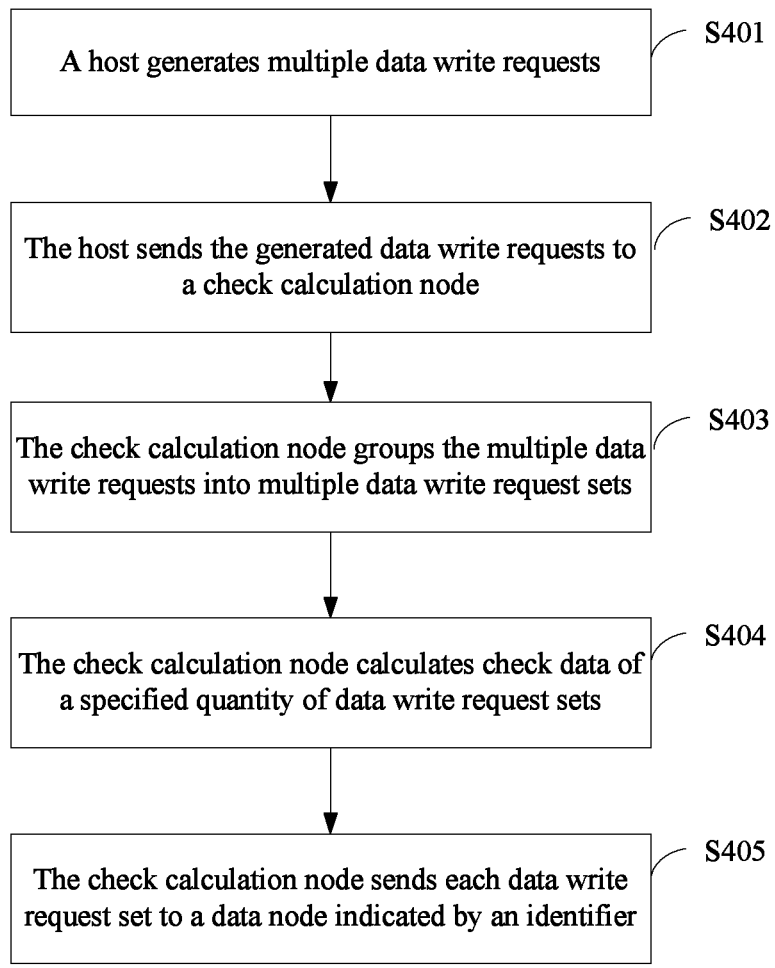
FIG. 5 is a schematic flowchart of another data check method according to an embodiment of the present disclosure.

The data check method applied to the first scenario has another implementation. A difference between this implementation and the implementation shown in FIG. 4 is as follows: In this implementation, a check calculation node groups multiple received data write requests into multiple data write request sets according to data node identifiers included in the data write requests, and calculates check data when sizes of a specified quantity of data write request sets reach a preset data amount. These operations are performed by the host 11 in the implementation shown in FIG. 4. Specifically, as shown in FIG. 5, the data check method may be implemented in the following steps.

S401, This step is similar to step S101 shown in FIG. 4, and details are not repeated herein.

S402, The host 11 sends the generated data write requests to a check calculation node.

S403, The check calculation node groups the multiple data write requests into multiple data write request sets according to data node identifiers included in the data write requests, where each set includes multiple data write requests having a same data node identifier. A difference between this step and step S102 in FIG. 4 is that this step is performed by the check calculation node. A remaining part is similar to that in step S102 shown in FIG. 4, and details are not repeated herein.

S404, When a size of all data write requests in each of a specified quantity of data write request sets reaches a preset data amount, the check calculation node calculates check data of the specified quantity of data write request sets. A difference between this step and step S103 in FIG. 4 is that this step is performed by the check calculation node. A remaining part is similar to that in step S103 shown in FIG. 4, and details are not repeated herein.

S405, The check calculation node sends each of the specified quantity of data write request sets to a data node indicated by an identifier included in the data write request set. A difference between this step and step S104 in FIG. 4 is that this step is performed by the check calculation node. A remaining part is similar to that in step S104 shown in FIG. 4, and details are not repeated herein.

Figure 6:
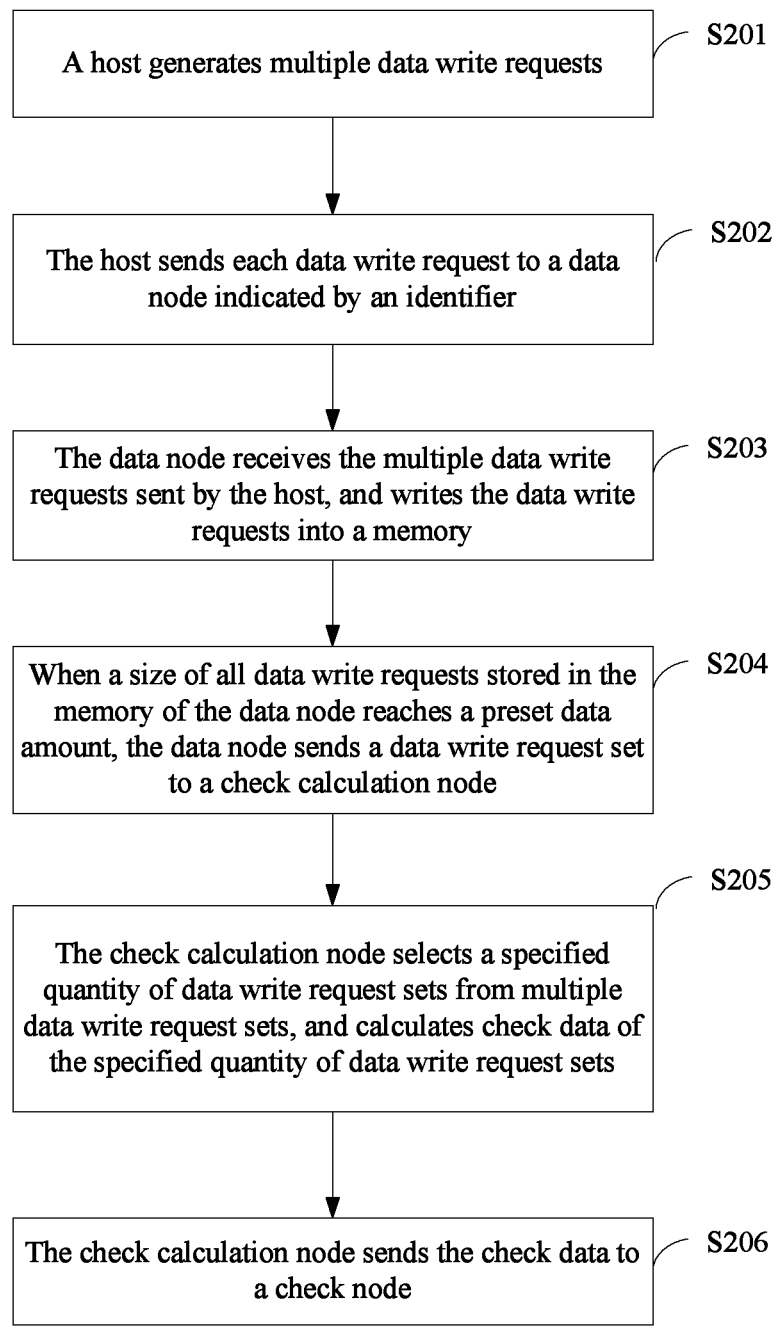
FIG. 6 is a schematic flowchart of still another data check method according to an embodiment of the present disclosure.

After calculating the check data, the check calculation node may directly store the check data locally, and does not need to forward the check data to another storage node for storage. If more than one piece of check data is calculated according to a preset check mode, the check calculation node may select a storage node from a storage system 10 to store another piece of check data. A selection manner is similar to that in step S105 shown in FIG. 4, and details are not repeated herein. FIG. 6 is a flowchart of a data check method applied to a second scenario. As shown in FIG. 6, the method includes the following steps.

S201, A host 11 generates multiple data write requests, where each data write request includes data, an identifier of a data node into which the data is to be written, and a logical address into which the data is to be written. Content of step S201 is similar to that of step S101 in the method shown in FIG. 4, and details are not repeated herein.

S202, The host 11 sends each data write request to a data node indicated by the identifier, included in the data write request, of the data node into which the data is to be written.

S203, The data node receives the multiple data write requests sent by the host 11, and writes the data write requests into a memory 226. Specifically, this step may be performed by a processor 225 in a controller 221.

S204, When a size of all data write requests stored in the memory 226 of the data node reaches a preset data amount, the data node sends a data write request set to a check calculation node. The data write request set includes multiple data write requests, and a size of the multiple data write requests reaches the preset data amount.

Specifically, this step may be performed by the processor 225 in the controller 221. Each time the data node receives a data write request sent by the host 11, the data node writes the data write request into the memory 226. Therefore, in the memory 226, data write requests are accumulated. When a size of the accumulated data write requests reaches the preset data amount, the data node sends these accumulated data write requests as one set to the check calculation node. The preset data amount is preset by the storage system 10, for example, 16 KB.

All data write requests in a memory 226 of any data node are sent to the check calculation node, provided that a size of all the data write requests in the memory 226 reaches the preset data amount. Whether a size of accumulated data write requests in a memory of another data node reaches the preset data amount is not considered. In an actual application, the data node may have a time limit requirement on accumulated data write requests. When a preset time limit expires, if the size of all the data write requests in the memory 226 does not reach the preset data amount, 0 or other data with a special mark may be used for supplementation.

The foregoing describes a scenario of one data node. For multiple data nodes in the storage system 10, each data node 22 locally collects data write request sets whose sizes reach the preset data amount, and then sends these data write request sets to the check calculation node. The check calculation node calculates check data according to the multiple received data write request sets, to form a stripe.

S205, The check calculation node receives multiple data write request sets, selects a specified quantity of data write request sets from the multiple data write request sets, and calculates check data of the specified quantity of data write request sets, where the specified quantity of data write request sets are subsets of the multiple data write request sets, and the specified quantity of data write request sets include different data node identifiers.

For example, a storage node C is used as the check calculation node. The storage node C may communicate with any storage node 22 in the storage system 10. After receiving multiple data write request sets, the storage node C selects a specified quantity of data write request sets from the multiple data write request sets according to a preset check mode, and calculates check data of the specified quantity of data write request sets. A 5+1 mode is used as an example. After selecting, from the multiple received data write request sets, five data write request sets that are from different data nodes, the storage node C calculates check data of the five data write request sets. In some cases, the storage node C may calculate check data of a data write request set stored locally, and only needs to receive data write request sets sent by remaining four data nodes.

When receiving a data write request set, the check calculation node stores the data write request set, allocates an identifier to the data write request set, and then writes the identifier of the data write request set into a linked list or another data structure. The identifier of the data write request set may be the same as a data node identifier included in a data write request in the data write request set, or different from a data node identifier included in a data write request in the data write request set. When the identifier of the data write request set is different from the data node identifier included in the data write request in the data write request set, the check calculation node stores a correspondence between the identifier of the data write request set and the data node identifier. In an implementation, the identifier of the data write request set is allocated by the check calculation node. After allocating the identifier, the check calculation node sends the identifier of the data write request set to a data node in which the data write request set is located. The data node stores the identifier of the data write request set. In another implementation, the identifier of the data write request set is allocated by a data node in which the data write request set is located. After allocating the identifier, the data node sends the identifier of the data write request set to the check calculation node. The check calculation node stores the identifier of the data write request set.

To ensure data reliability, when selecting a particular quantity of data write request sets to form a stripe, the check calculation node needs to ensure that multiple data write request sets forming a same stripe are from different data nodes. The 5+1 mode is used as an example. The check calculation node needs to select five data write request sets from the linked list. The check calculation node may receive multiple data write request sets in a particular time, and some of the data write request sets may be from a same data node. Therefore, the check calculation node further needs to ensure that the five data write request sets are from different data nodes. Specifically, the check calculation node may select the five data write request sets from the linked list according to the stored correspondence between the identifier of the data write request set and the data node identifier, or directly according to the identifier of the data write request set. It should be noted that, when selecting data write request sets to form a stripe, the check calculation node does not need to consider a sequence of writing the data write request sets into the linked list, but only needs to ensure that the multiple data write request sets forming the stripe are from different data nodes.

S206, The check calculation node sends the check data to a check node, where the check node is different from a data node storing a data write request set.

Specifically, the check calculation node may select one or more storage nodes from remaining storage nodes (except the data node that already stores the data write request set) to store the check data. The storage node configured to store the check data is referred to as the check node in this embodiment. The check node cannot be the same as any of data nodes in which the specified quantity of data write request sets are located. This is intended for preventing that both a data write request set and check data that are included in a stripe are lost when a fault occurs on a storage node. The selected storage node configured to store the check data cannot be a data node storing a data write request set in a current stripe, but may be a data node storing a data write request set in another stripe. In this embodiment, a storage node is not limited to be dedicated to store a data write request set or check data.

In addition, the check calculation node allocates a stripe identifier to each stripe. Different stripes have different stripe identifiers. Moreover, the host allocates identifiers to data write request sets and check data that are included in each stripe, and sends an identifier of a data write request set to a data node in which the data write request set is located.

Alternatively, each data node allocates an identifier to a stored data write request set, and sends the identifier of the data write request set to the check calculation node. The check calculation node records a correspondence between a stripe identifier of each stripe and an identifier of each data write request set included in the stripe and a correspondence between the stripe identifier and an identifier of check data.

According to the data check method shown in FIG. 6, when a size of all accumulated data write requests reaches a preset data amount, each data node sends these data write requests as one data write request set to a check calculation node. The check calculation node selects a specified quantity of data write request sets from multiple received data write request sets, calculates check data of the specified quantity of data write request sets, and sends the check data to a check node for storage. Therefore, data reliability is ensured. Each data write request set includes multiple data write requests having a same data node identifier, and a data node into which each data write request is to be written is selected by a host according to data in the data write request or a logical address, in the data write request, into which the data is to be written. Therefore, each data write request set includes data write requests of a same type. There is a relatively high possibility of simultaneously reading data in the data write requests of the same type. Therefore, the data can be read from one data node, and a cross-node read operation does not need to be performed, thereby improving data reading efficiency.

In the data check method shown in FIG. 4, FIG. 5, or FIG. 6, data write requests of a same type are written into a same data node. After writing the data write requests into the data node, the data node further needs to create and store metadata.

The metadata includes a correspondence between an identifier of a data write request set and a logical address into which data in each data write request is to be written. The metadata further includes a location of each data write request in the data write request set. In this embodiment, the location of each data write request in the data write request set is referred to as an internal offset. For example, a correspondence between a data write request set and a logical address into which data in each data write request included in the data write request set is to be written is shown in table 1:

TABLE 1

| Logical address | Identifier of a data write request set | Internal offset |
| --- | --- | --- |
| 0x1 + 0x100 + 4096 | 1 | 0x1000 |
| 0x2 + 0x400 + 4096 | 1 | 0x2000 |
| 0x3 + 0x800 + 4096 | 1 | 0x3000 |

As shown in the foregoing table, a data write request set with an identifier "1" includes three data write requests. Each data write request not only includes data, but also includes a logical address into which the data is to be written. In addition, each data write request has a corresponding location inside the data write request set. The first data write request is used as an example. A logical address of the data write request includes a volume ID, an LBA, and a length. The volume ID is 0x1, the LBA is 0x100, and the length is 4096. The data write request belongs to the data write request set with the identifier "1", and a location in the data write request set is 0x1000.

If a host groups multiple data write requests into multiple data units, calculates check data of the multiple data units, and then sends the data units and the check data to multiple storage nodes in a storage system for storage, metadata (a correspondence between a data write request and a data unit) is stored in the host. When an operation such as garbage collection is performed on a data unit in a storage node subsequently, a message needs to be sent to the host to modify the metadata. Therefore, the operation is complex, and bandwidth is consumed.

However, in this embodiment, data write requests of a same type are stored as one data write request set in one data node. Therefore, metadata related to the data write request set is also locally stored in the data node. If an operation such as garbage collection is performed on the data write request set subsequently, the metadata can be directly modified locally.

The metadata may be stored in a memory 226 of the data node. To ensure metadata reliability, check data of metadata in each data node also needs to be calculated and stored. Specifically, data write requests received by the data node increase, so does metadata stored in the memory 226. When a size of accumulated metadata in the memory 226 reaches a preset data amount, the data node sends a metadata set to a metadata check calculation node. The metadata set is metadata whose size reaches the preset data amount. The preset data amount may be preset by the storage system 10, for example, 16 KB. The metadata check calculation node is a storage node configured to calculate check data of the metadata set. In an actual implementation, the metadata check calculation node may be the same as a check calculation node. In addition, in this embodiment, a data node 22 not only sends the metadata set to the metadata check calculation node, but also needs to send an identifier of the data node to the metadata check calculation node. The metadata set and the identifier may be encapsulated into one message for sending, or may be sent separately.

The metadata check calculation node receives a metadata set and an identifier of each data node that are sent by the data node, allocates an identifier to each metadata set, and stores a correspondence between the identifier of the metadata set and the identifier of the data node. To ensure metadata reliability, the metadata check calculation node calculates check data of the metadata set. Specifically, the metadata check calculation node selects a specified quantity of metadata sets from multiple metadata sets according to the correspondence between the identifier of the metadata set and the identifier of the data node, and calculates check data of the specified quantity of selected metadata sets. The selected metadata sets need to be corresponding to different data node identifiers.

Similar to the foregoing description, the specified quantity is determined according to a check mode preset by the storage system 10. It should be noted that the check mode of the metadata set may be the same as or different from a check mode of a data write request set.

The metadata check calculation node may select, in the storage system 10, a storage node as a metadata check node, and send the check data of the metadata sets to the metadata check node. The selected metadata check node is different from a data node configured to store the metadata sets. However, the selected metadata check node may be a data node storing a metadata set in another stripe. In this embodiment, a data node is not limited to be dedicated to store a metadata set or check data of a metadata set.

When a total amount of data stored in a memory 226 of each data node reaches a particular threshold, the data node needs to write the data in the memory 226 into a solid state disk 222. In this case, a controller 221 in the data node may allocate, to each data write request set by using each data write request set as a granularity, a logical address for writing the data write request set into the solid state disk (referred to as a hard disk logical address in this embodiment), and store a correspondence between an identifier of the data write request set and the allocated hard disk logical address. The solid state disk 222 receives a data write request set sent by the controller 221 and the logical address that is for writing the data write request set into the solid state disk and that is allocated to the data write request set, and writes the data write request set into one or more blocks (English: block). In addition, the solid state disk 222 stores a correspondence between the logical address that is for writing the data write request set into the solid state disk and that is allocated to the data write request set and an actual address. The actual address may be a physical address of the data in the solid state disk, or may be an address that is virtualized based on the physical address and that is only visible to the solid state disk.

After a period of time, some data in a data write request set stored by each data node may become invalid data. Validity of data is determined according to whether the data is modified. If the data is written into the data node for the first time, the data may be recorded as valid (referred to as valid data). If the data is modified, the data is recorded as invalid (referred to as invalid data). Table 1 is used as an example. When a data node in which a data write request set with the identifier 1 is located receives the fourth data write request, and a logical address into which data in the fourth data write request is to be written is the same as a logical address into which data in the first data write request is to be written, it indicates that the fourth data write request is used to overwrite the first data write request. Because of a writing characteristic of the solid state disk, the data (old data) in the first data write request is not directly overwritten by the data (new data) in the fourth data write request, but a blank block on the solid state disk is allocated, and the new data is written into the blank block. Therefore, the data in the first data write request becomes invalid data. This also means that some data in the data write request set with the identifier 1 becomes invalid data. The data node may use a bitmap to record information about invalid data included in each data write request set. The information about the invalid data includes a logical address into which the invalid data is to be written and a data amount of the invalid data. For example, each "bit" of the bitmap is corresponding to a logical address that has a size of 1 KB and into which data is to be written. A "bit" 1 indicates that data stored at the logical address is valid, and a "bit" 0 indicates that data stored at the logical address is invalid.

Figure 7:
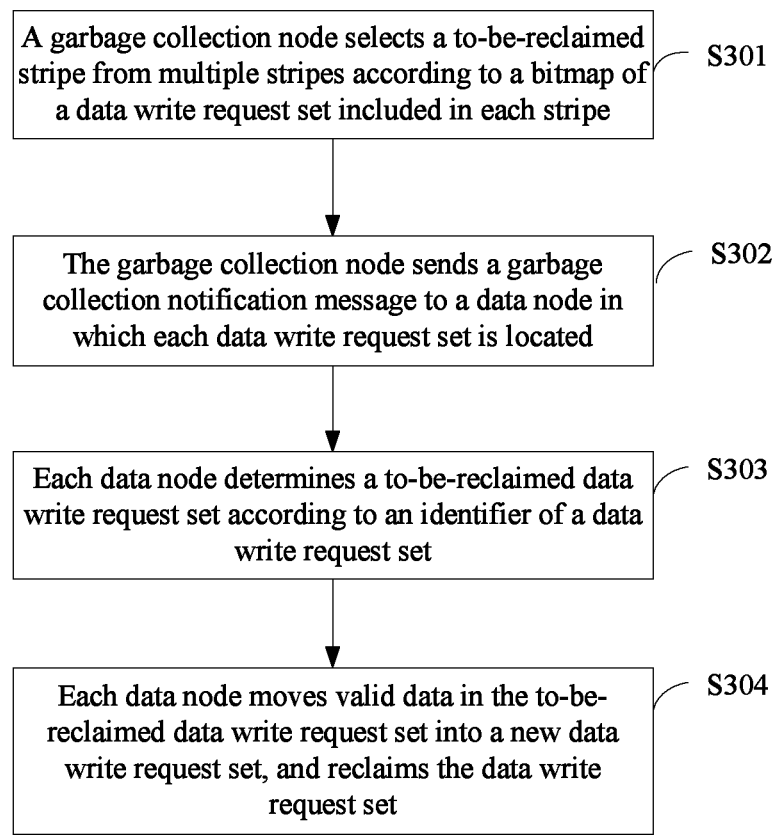
FIG. 7 is a schematic flowchart of a systematic garbage collection method according to an embodiment of the present disclosure.

As the invalid data increases, the data node needs to perform a systematic garbage collection operation. Systematic garbage collection is performed in a unit of a stripe, and data write request sets included in a stripe are distributed in the data node. Therefore, systematic garbage collection is performed in a unit of a data write request set inside the data node. The storage system 10 further includes a garbage collection node. The garbage collection node is a node, in the storage nodes 22, configured to perform the systematic garbage collection operation. FIG. 7 is a schematic flowchart of a systematic garbage collection method. As shown in FIG. 7, the method may include the following steps.

S301. The garbage collection node selects a to-be-reclaimed stripe from multiple stripes according to a bitmap of a data write request set included in each stripe.

In a first application scenario, a host 11 sends an identifier of a stripe and a correspondence between the stripe identifier and an identifier of each data write request set included in the stripe to the garbage collection node. In a second application scenario, a check calculation node sends an identifier of a stripe and a correspondence between the stripe identifier and an identifier of each data write request set included in the stripe to the garbage collection node. In addition, regardless of the first application scenario or the second application scenario, a data node needs to send a bitmap of the data write request set to the garbage collection node.

The garbage collection node needs to select a to-be-reclaimed stripe from multiple stripes. To ensure highest efficiency of a systematic garbage collection operation, the garbage collection node usually selects a stripe including a largest amount of invalid data as the to-be-reclaimed stripe. Therefore, statistics on a data amount of invalid data included in each stripe needs to be collected. Specifically, the garbage collection node may determine, according to the correspondence between the stripe identifier and the identifier of each data write request set included in the stripe, all data write request sets included in the stripe, and then determine, according to a bitmap of each data write request set, a data amount of invalid data included in each data write request set, so as to determine an amount of invalid data included in the stripe. Therefore, the garbage collection node may use the stripe including the largest amount of invalid data as the to-be-reclaimed stripe. In addition, in this embodiment, the to-be-reclaimed stripe may be selected according to another condition. For example, a stripe on which no systematic garbage collection operation is performed for a long time is selected, or systematic garbage collection is sequentially performed on various stripes according to a preset sequence.

S302. The garbage collection node sends a garbage collection notification message to a data node in which each data write request set is located.

As described above, the garbage collection node may determine, according to the stripe identifier and the correspondence between the stripe identifier and the identifier of each data write request set included in the stripe, an identifier of the data write request set included in each stripe. Then, the data node in which each data write request set is located is determined according to a correspondence between the identifier of the data write request set and an identifier of the data node (if the identifier of the data write request set is consistent with the identifier of the data node, the data node in which each data write request set is located may be directly determined according to the identifier of the data write request set), so as to send the garbage collection notification message to the data node in which each data write request set is located. The message is used to instruct the data node to perform a systematic garbage collection operation on the data write request set. The message includes the identifier of the data write request set.

S303. Each data node receives the garbage collection notification message, and determines a to-be-reclaimed data write request set according to an identifier, carried in the message, of a data write request set. Then, each data node determines, according to a bitmap of the to-be-reclaimed data write request set, valid data and invalid data that are included in the to-be-reclaimed data write request set. For example, data in the first data write request in table 1 becomes invalid data. Data in the second data write request and data in the third data write request are still valid data.

S304. Each data node moves valid data in the to-be-reclaimed data write request set into a new data write request set, and reclaims the data write request set.

Moving the valid data into the new data write request set is to combine, into the new data write request set, the data write request in which the valid data is located. For example, the second data write request and the third data write request in table 1 are read from a solid state disk 222 into a memory 226 (if the second data write request or the third data write request are already stored in the memory 226, this operation does not need to be performed). After a size of all data write requests stored in the memory 226 re-reaches a preset data amount, a new data write request set is generated by means of combination. Specifically, the data node then determines, according to the bitmap of the to-be-reclaimed data write request set, a logical address into which the valid data included in the data write request set is to be written (the logical address herein is a logical address into which data is to be written), removes a correspondence between the logical address into which the valid data is to be written and the identifier of the data write request set, and stores a correspondence between the logical address into which the valid data is to be written and an identifier of the new data write request set. The metadata is locally stored in the data node. Therefore, after performing systematic garbage collection, the data node can directly modify the metadata locally, and the cross-node operation does not need to be performed. Then, the data node sends a hard disk logical address of the to-be-reclaimed data write request set to the solid state disk, and the solid state disk records blocks corresponding to the hard disk logical address as invalid. When performing internal garbage collection subsequently, the solid state disk can directly erase these blocks, and does not need to replicate the valid data. Therefore, a quantity of times of write amplification internally performed on the solid state disk is reduced. In addition, the data node further needs to remove a correspondence between an identifier of the to-be-reclaimed data write request set and the allocated hard disk logical address. When all data write request sets included in a stripe are reclaimed, check data included in this stripe is no longer required, and the garbage collection node may instruct a check node to remove the check data.

Systematic garbage collection provided in this embodiment means that each data node combines valid data into another local data write request set. Therefore, the data node independently completes systematic garbage collection and does not need to exchange data with another data node, thereby saving bandwidth between data nodes.

A person of ordinary skill in the art may understand that each aspect of the present disclosure or a possible implementation of each aspect may be specifically implemented as a system, a method, or a computer program product. Therefore, each aspect of the present disclosure or the possible implementation of each aspect may adopt a form of hardware only embodiments, software only embodiments (including firmware, resident software, and the like), or embodiments in combination of software and hardware, which are uniformly referred to as a "circuit", a "module", or a "system" herein. In addition, each aspect of the present disclosure or the possible implementation of each aspect may take a form of a computer program product, where the computer program product is computer-readable program code stored in a computer-readable storage medium.

The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM), and an optical disk.

A processor in a computer reads the computer-readable program code stored in the computer-readable storage medium, so that the processor can perform a functional action specified in each step or each step combination in the flowcharts.

The computer-readable program code may be completely executed on a user's computer, may be partially executed on a user's computer, may be implemented as a standalone software package, may be partially implemented on a user's computer and partially implemented on a remote computer, or may be completely executed on a remote computer or a server. It should also be noted that, in some alternative implementation solutions, steps in a flowchart or functions indicated by blocks in a block diagram may not be implemented in a sequence indicated in the flowchart or block diagram. For example, two steps or blocks that depend on an involved function and are shown in sequence may be actually executed concurrently, or sometimes these blocks may be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A storage system, comprising a host, a check node, and multiple data nodes, wherein each data node has a unique identifier, and the host is configured to:
group multiple data write requests into multiple data write request sets according to data node identifiers included in the data write requests, wherein each data write request set comprises multiple data write requests having a same data node identifier, wherein each data write request comprises data, a logical address into which the data is to be written, and an identifier of a data node into which the data is to be written, and wherein the data node into which the data is to be written is selected by the host according to the data or the logical address;
when a size of all data write requests in each of a specified quantity of data write request sets reaches a preset data amount, calculate check data of the specified quantity of data write request sets, wherein the specified quantity of data write request sets are subsets of the multiple data write request sets;
send each respective data write request set of the specified quantity of data write request sets to a data node indicated by a respective data node identifier included in the respective data write request set; and
send the check data to the check node.

2. The storage system according to claim 1, wherein
the host is further configured to: allocate a respective identifier to the respective data write request set, and send the respective identifier to the data node indicated by the respective data node identifier, and wherein
the data node indicated by the respective data node identifier is configured to:
receive a data write request set and an identifier of the data write request set; and
create metadata, wherein the metadata comprises a correspondence between the identifier of the data write request set and a logical address into which data in each data write request of the data write request set is to be written and a correspondence between the logical address into which the data in each data write request of the data write request set is to be written and an internal offset.

3. The storage system according to claim 2, wherein the storage system further comprises a metadata check calculation node and a metadata check node, and wherein
the data node indicated by the respective data node identifier is further configured to:
send a metadata set and an identifier of the data node to the metadata check calculation node when determining that accumulated metadata reaches the preset data amount, wherein the metadata set comprises the accumulated metadata that reaches the preset data amount, and wherein
the metadata check calculation node is configured to:
receive a respective metadata set and a respective identifier of each of the multiple data nodes, wherein the respective metadata set and the respective identifier are sent by a respective one of the multiple data nodes;
store a respective correspondence between the respective metadata set and the respective identifier of each of the multiple data nodes;
select a specified quantity of metadata sets from multiple received metadata sets according to the correspondence, wherein the specified quantity of selected metadata sets respectively correspond to different data node identifiers;
calculate check data of the specified quantity of selected metadata sets; and
send the check data of the specified quantity of metadata sets to the metadata check node, wherein the metadata check node is different from a data node storing each of the specified quantity of metadata sets.

4. The storage system according to claim 2, wherein the storage system further comprises a garbage collection node, and wherein
the host is further configured to:
allocate an identifier to a stripe, wherein the stripe comprises the specified quantity of data write request sets and the check data of the specified quantity of data write request sets; and
send a respective correspondence between the stripe identifier and a respective identifier of each data write request set in the stripe to the garbage collection node, wherein the data node indicated by the respective data node identifier is further configured to
send a stored bitmap of a particular data write request set to the garbage collection node, wherein the bitmap is used to indicate a data amount of invalid data in the particular data write request set, and wherein
the garbage collection node is configured to:
determine, according to the respective correspondence between the stripe identifier and the respective identifier of each data write request set in the stripe and according to a respective bitmap of each data write request set in the strip, that a data amount of invalid data in the stripe is greater than a data amount of invalid data comprised in any other stripe; and
when determining that the data amount of invalid data in the stripe is greater than the data amount of invalid data in any other stripe, send a garbage collection notification message to a data node in which each data write request set in the stripe is located, wherein the garbage collection notification message identifies a data write request set.

5. The storage system according to claim 4, wherein
the data node in which each data write request set in the stripe is located is further configured to: perform a systematic garbage collection operation on the data write request set identified by the garbage collection notification message, the systematic garbage collection operation performed according to a stored bitmap of the data write request set identified by the garbage collection notification message after receiving the garbage collection notification message.

6. The storage system according to claim 1, wherein the specified quantity is determined according to a preset check mode.

7. A data check method in a storage system, wherein the storage system comprises a host, a check node, and multiple data nodes each of which has a unique identifier, and wherein the method comprises:
grouping, by the host, multiple data write requests into multiple data write request sets according to data node identifiers included in the data write requests, wherein each data write request set comprises multiple data write requests having a same data node identifier, wherein each data write request comprises data, a logical address into which the data is to be written, and an identifier of a data node into which the data is to be written, and wherein the data node into which the data is to be written is selected by the host according to the data or the logical address;
calculating, by the host, check data of a specified quantity of data write request sets, wherein a size of all data write requests in each of the specified quantity of data write request sets reaches a preset data amount, wherein the specified quantity of data write request sets are subsets of the multiple data write request sets;
sending, by the host, each respective data write request set of the specified quantity of data write request sets to a respective data node indicated by a data node identifier comprised in the respective data write request set; and
sending, by the host, the check data to the check node.

8. The method according to claim 7, further comprising:
allocating, by the host, a respective identifier to the respective data write request set, and sending the respective identifier to the data node indicated by the data node identifier;
receiving, by the data node indicated by the respective data node identifier, a data write request set and an identifier of the data write request set; and
creating, by the data node, metadata including a correspondence between the identifier of the data write request set and a logical address into which data in each data write request of the data write request set is to be written, and a correspondence between the logical address into which the data in each data write request of the data write request set is to be written and an internal offset.

9. The method according to claim 8, wherein the storage system further comprises a metadata check calculation node and a metadata check node, and wherein the method further comprises:
sending, by the data node indicated by the respective data node identifier, a metadata set and an identifier of the data node to the metadata check calculation node, wherein accumulated metadata is determined to reach the preset data amount, wherein the metadata set comprises the accumulated metadata that reaches the preset data amount, and wherein
receiving, by the metadata check calculation node, a respective metadata set and a respective identifier of each of the multiple data nodes, wherein the metadata set and the respective identifier are sent by a respective one of the multiple data nodes;
storing, by the metadata check calculation node, a respective correspondence between the respective metadata set and the respective identifier of each of the multiple data nodes;
selecting, by the metadata check calculation node, a specified quantity of metadata sets from multiple received metadata sets according to the correspondence, wherein the specified quantity of selected metadata sets respectively correspond to different data node identifiers; and
calculating, by the metadata check calculation node, check data of the specified quantity of selected metadata sets, and
sending, by the metadata check calculation node, the check data of the specified quantity of metadata sets to the metadata check node, wherein the metadata check node is different from a data node storing each of the specified quantity of metadata sets.

10. The method according to claim 8, wherein the storage system further comprises a garbage collection node, and the method further comprises:
allocating, by the host, an identifier to a stripe, wherein the stripe comprises the specified quantity of data write request sets and the check data of the specified quantity of data write request sets;
sending, by the host, a respective correspondence between the stripe identifier and a respective identifier of each data write request set in the stripe to the garbage collection node;
sending, by the data node indicated by the respective data node identifier, a stored bitmap of a particular data write request set to the garbage collection node, wherein the bitmap is used to indicate a data amount of invalid data in the particular data write request set;
determining, by the garbage collection node according to the respective correspondence between the stripe identifier and the respective identifier of each data write request set in the stripe and according to a respective bitmap of each data write request set in the strip, that a data amount of invalid data in the stripe is greater than a data amount of invalid data comprised in any other stripe; and
sending, by the garbage collection node, a garbage collection notification message to a data node in which each data write request set in the stripe is located, wherein the data amount of invalid data in the stripe is determined to be greater than the data amount of invalid data in any other stripe, wherein the garbage collection notification message identifies a data write request set.

11. The method according to claim 10, further comprising:
performing, by the data node in which each data write request set in the stripe is located, a systematic garbage collection operation on the data write request set identified by the garbage collection notification message, the systematic garbage collection operation performed according to a stored bitmap of the data write request set identified by the garbage collection notification message after receiving the garbage collection notification message.

12. The method according to claim 7, wherein the specified quantity is determined according to a preset check mode.

13. A storage system, wherein the storage system comprises a check node, a check calculation node, and multiple data nodes each of which has a unique identifier,
wherein each data node is configured to send a respective data write request set to the check calculation node, wherein the respective data write request set comprises one or more data write requests, each data write request including respective data and a respective identifier of a data node into which the respective data is to be written, and a size of the respective data write request set is equal to a preset data amount, and wherein
the check calculation node is configured to:
receive multiple data write request sets;
select a specified quantity of data write request sets from the multiple data write request sets, wherein the specified quantity of data write request sets are subsets of the multiple data write request sets, and wherein the specified quantity of data write request sets comprise different data node identifiers;
calculate check data of the specified quantity of data write request sets; and
send the check data to the check node, wherein the check node is different from any data node in which one of the specified quantity of data write request sets is located.

14. The storage system according to claim 13, wherein each data write request further comprises a logical address into which the respective data is to be written, and the data node into which the respective data is to be written is selected by a host in the storage system according to the respective data or the logical address into which the respective data is to be written; and
each data node is further configured to receive multiple data write requests sent by the host.

15. The storage system according to claim 14, wherein each data node is further configured to:
allocate an identifier to a stored data write request set, and send the identifier of the stored data write request set to the check calculation node; and
create metadata including a correspondence between the identifier of the stored data write request set and a logical address into which data in each data write request of the stored data write request set is to be written and a correspondence between the logical address into which the data in each data write request of the stored data write request set is to be written and an internal offset.

16. The storage system according to claim 15, wherein the storage system further comprises a metadata check calculation node and a metadata check node, wherein
each data node is further configured to:
send a respective metadata set and a respective identifier of a respective data node to the metadata check calculation node when determining that accumulated metadata reaches the preset data amount, wherein the metadata set comprises the accumulated metadata that reaches the preset data amount and wherein the metadata check calculation node is configured to:
receive the respective metadata set and the respective identifier of the respective data node;
store a correspondence between the respective metadata set and the respective identifier of the respective data node;
select specified quantity of metadata sets from multiple received metadata sets according to the correspondence, wherein the specified quantity of metadata sets correspond to different data node identifiers;
calculate check data of the specified quantity of metadata sets; and
send the check data of the specified quantity of metadata sets to the metadata check node, wherein the metadata check node is different from a data node storing each of the specified quantity of metadata sets.

17. The storage system according to claim 15, wherein the storage system further comprises a garbage collection node, wherein the check calculation node is further configured to:
allocate an identifier to a stripe, wherein the stripe comprises the specified quantity of data write request sets and the check data of the specified quantity of data write request sets; and
send a respective correspondence between the stripe identifier and a respective identifier of each data write request set in the stripe to the garbage collection node, wherein each data node is further configured to
send a stored bitmap of a particular data write request set to the garbage collection node, wherein the bitmap is used to indicate a data amount of invalid data in the particular data write request set, and
wherein the garbage collection node is configured to:
determine, according to the respective correspondence between the stripe identifier and the respective identifier of each data write request set in the stripe and according to a respective bitmap of each data write request set, that a data amount of invalid data in the stripe is greater than a data amount of invalid data comprised in any other stripe; and
when determining that the data amount of invalid data comprised in the stripe is greater than the data amount of invalid data comprised in any other stripe, send a garbage collection notification message to a data node in which each data write request set comprised in the stripe is located, wherein each garbage collection notification message comprises an identifier of a data write request set.

18. The storage system according to claim 17, wherein the data node in which each data write request set comprised in the stripe is located is further configured to:
perform a systematic garbage collection operation on a data write request set identified by the garbage collection notification message according to a stored bitmap of the data write request set identified by the garbage collection notification message after receiving the garbage collection notification message.

19. The storage system according to claim 13, wherein the specified quantity is determined according to a preset check mode.

20. A data check method, wherein the method is applied to a storage system, the storage system comprises a check node, a check calculation node, and multiple data nodes, each data node has a unique identifier, and wherein the method comprises:
sending, by each data node, a respective data write request set to the check calculation node, wherein the respective data write request set comprises multiple data write requests, each data write request including respective data and a respective identifier of a data node into which the respective data is to be written, and a size of the respective data write request set is equal to a preset data amount;
receiving, by the check calculation node, multiple data write request sets;
selecting, by the check calculation node, a specified quantity of data write request sets from the multiple data write request sets, wherein the specified quantity of data write request sets are subsets of the multiple data write request sets, and wherein the specified quantity of data write request sets are from different data nodes;
calculating, by the check calculation node, check data of the specified quantity of data write request sets; and
sending by the check calculation node, the check data to the check node, wherein the check node is different from a data node in which one of the specified quantity of data write request sets is located.

21. The method according to claim 20, wherein each data write request further comprises a logical address into which the respective data is to be written, and the data node into which the respective data is to be written is selected by a host in the storage system according to the respective data or the logical address into which the respective data is to be written; and the method further comprises:
receiving, by each data node, multiple data write requests sent by the host.

22. The method according to claim 21, further comprising:
allocating, by each data node, an identifier to a stored data write request set;
sending, by each data node, the identifier of the stored data write request set to the check calculation node; and
creating, by each data node, metadata including a stored correspondence between the identifier of the data write request set and a logical address into which data in each data write request of the stored data write request set is to be written and a correspondence between the logical address into which the data in each data write request of the stored data write request set is to be written and an internal offset.

23. The method according to claim 22, wherein the storage system further comprises a metadata check calculation node and a metadata check node, and wherein the method further comprises:
sending, by each data node, a respective metadata set and a respective identifier of a respective data node to the metadata check calculation node, wherein accumulated metadata is determined to reach the preset data amount, wherein the metadata set comprises the accumulated metadata that reaches the preset data amount; and receiving, by the metadata check calculation node, the respective metadata set and the respective identifier of the respective data node;

storing, by the metadata check calculation node, a correspondence between the respective metadata set and the respective identifier of the respective data node;

selecting, by the metadata check calculation node, specified quantity of metadata sets from multiple received metadata sets according to the correspondence, wherein the specified quantity of metadata sets correspond to different data node identifiers;

calculating, by the metadata check calculation node, check data of the specified quantity of metadata sets; and sending the check data of the specified quantity of metadata sets to the metadata check node, wherein the metadata check node is different from a data node storing each of the specified quantity of metadata sets.

24. The method according to claim 22, wherein the storage system further comprises a garbage collection node, and wherein the method further comprises:

allocating, by the check calculation node, an identifier to a stripe, wherein the stripe comprises the specified quantity of data write request sets and the check data of the specified quantity of data write request sets;

sending, by the check calculation node, a respective correspondence between the stripe identifier and a respective identifier of each data write request set in the stripe to the garbage collection node;

sending, by each data node, a stored bitmap of a particular data write request set to the garbage collection node, wherein the bitmap is used to indicate a data amount of invalid data in the particular data write request set; and determining, by the garbage collection node, according to the respective correspondence between the stripe identifier and the respective identifier of each data write request set in the stripe and according to a respective bitmap of each data write request set, that a data amount of invalid data in the stripe is greater than a data amount of invalid data comprised in any other stripe; and based on the determining that the data amount of invalid data comprised in the stripe is greater than the data amount of invalid data comprised in any other stripe, sending, by the garbage collection node, a garbage collection notification message to a data node in which each data write request set comprised in the stripe is located, wherein each garbage collection notification message comprises an identifier of a data write request set.

25. The method according to claim 24, further comprising:

after receiving the garbage collection notification message, performing, by the data node in which each data write request set comprised in the stripe is located, a systematic garbage collection operation on a data write request set identified by the garbage collection notification message according to a stored bitmap of the data write request set identified by the garbage collection notification message after receiving the garbage collection notification message.

26. The method according to claim 20, wherein the specified quantity is determined according to a preset check mode.

* * * * *